United States Patent
Bechtold et al.

(10) Patent No.: US 6,866,962 B2
(45) Date of Patent: Mar. 15, 2005

(54) SEALED RECHARGEABLE BATTERY

(75) Inventors: Dieter Bechtold, Bad Vilbel (DE); Uwe Kohler, Kassel (DE)

(73) Assignee: Varta Automotive Systems GmbH (DE)

(*) Notice: Subject to any disclaimer, the term of this patent is extended or adjusted under 35 U.S.C. 154(b) by 105 days.

(21) Appl. No.: 10/253,804

(22) Filed: Sep. 24, 2002

(65) Prior Publication Data

US 2003/0059670 A1 Mar. 27, 2003

(30) Foreign Application Priority Data

Sep. 24, 2001 (DE) .......................... 101 46 957

(51) Int. Cl.[7] .............................. H01M 4/00; H01M 6/00
(52) U.S. Cl. ..................... 429/94; 429/153; 429/185; 429/160; 29/623.2
(58) Field of Search .......................... 429/94, 153, 149, 429/185, 209, 57, 179, 100, 158, 160; 29/623.2, 623.1

(56) References Cited

U.S. PATENT DOCUMENTS 3,170,819 A    2/1965  Abramson
6,087,038 A  * 7/2000  Flament et al. ............. 429/120

FOREIGN PATENT DOCUMENTS

| DE | 19 03 641 B2 | 9/1969 |
|----|--------------|--------|
| DE | 197 50 069 A1 | 5/1999 |
| DE | 100 15 711 A1 | 10/2001 |
| EP | 0 314 318 B1 | 5/1989 |
| GB | 1 393 533 | 5/1975 |

* cited by examiner

*Primary Examiner*—Raymond Alejandro
(74) *Attorney, Agent, or Firm*—Foley & Lardner LLP

(57) ABSTRACT

A sealed rechargeable battery with sets of wound electrodes arranged in a housing, wherein the housing has at least two main chambers separated by a cell separating wall and in each of which there are located at least two electrode coils. The electrode coils within the main chambers are connected in parallel and the storage elements formed in the main chambers are electrically connected in series. The positive poles of the electrode coils in one main chamber point in one direction and in the neighboring main chamber they point in the opposite direction. The positive or negative electrodes of the electrode coils in one of the main chambers are respectively connected by a contact disk, which are provided with pole posts, and the opposite poles of all the cells are electrically connected in series by a contact disk connecting all the cells.

10 Claims, 3 Drawing Sheets

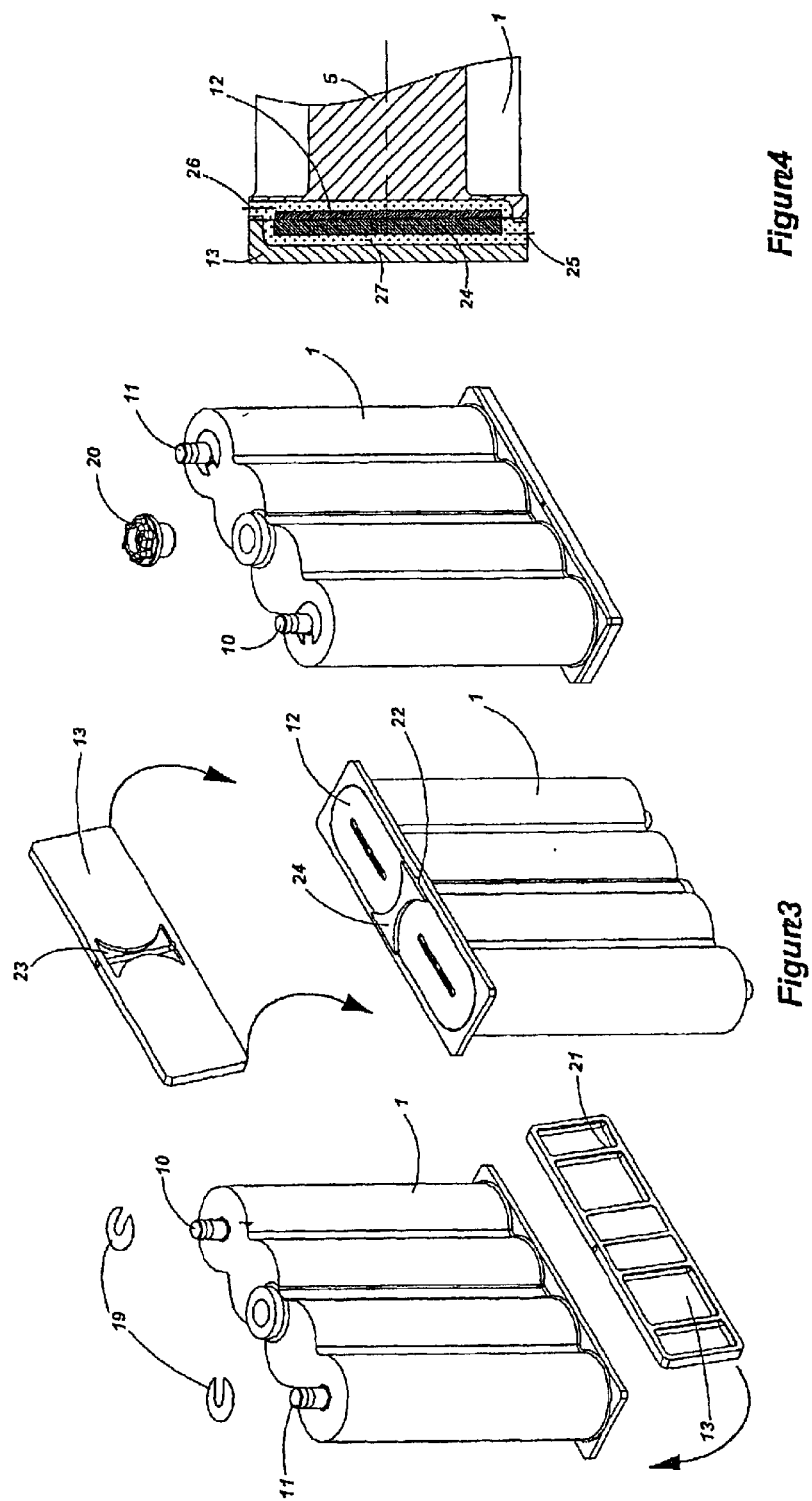

SEALED RECHARGEABLE BATTERY

RELATED APPLICATION

This application claims priority of German Patent Application No. De 101 46 957.8, filed Sep. 24, 2001.

FIELD OF THE INVENTION

This invention relates to a sealed rechargeable battery with sets of wound electrodes arranged in a housing, and to a method of producing such rechargeable batteries.

BACKGROUND

Electrochemical energy storage devices are commonly made in two different forms of construction. In one form of construction, the two electrodes are electrically separated from each other by, for example, a synthetic-fiber nonwoven as a separator, and rolled into a spiral coil which is introduced into a cylindrical vessel. The electrodes are connected via specially designed discharge elements or connectors with bushings through the cell wall. After feeding in the requisite amount of electrolyte, thereby filling the system of pores of the electrodes and separator, the cells are sealed.

In the case of prismatic cells, there is a stack of electrodes comprising a multiplicity of individual electrodes which are electrically separated from one another by separators and stacked in an alternating sequence. The positive and negative electrodes are respectively interconnected electrically and connected to corresponding pole bushings through the gastight housing. Such a cell is ready for operation after filling the system of pores of the electrodes and the separator.

Cylindrical cells are often used only for storage units with comparatively low capacities, since in the case of this type of construction it is only possible to increase the capacity by increasing the diameter or extending the height of the cylindrical coil. The first makes it more difficult to dissipate lost heat produced during cyclic operation, while a geometrical extension leaving the capacity of the cell the same results in an increase in the internal resistance or a deterioration in conductivity.

In the case of prismatic cell forms, on the other hand, it is possible for a higher capacity to be achieved without significant sacrifices in the ratio of capacity and conductivity by increasing the cell width with the cell thickness remaining the same. However, one particular advantage of the cylindrical form of construction over prismatic forms of construction is its greater dimensional stability. In particular in the case of water-based battery systems, it is possible for gassing to cause internal pressures to build up when they are under operating pressure. Cells of a prismatic form of construction are sensitive to such compressive stresses and tend to undergo deformations, which are undesired and have to be counteracted by complex design measures.

It is customary to accomplish higher capacities by interconnecting individual cells in parallel. Such connections are carried out both with individual gastight cells and with open cells. An interconnection of individual cylindrical cells makes it possible to accomplish higher capacity values while retaining good dimensional stability. However, this entails greater expenditure, since all the individual cells must be provided with a housing with seals, a valve, current collector, etc. In addition, it is necessary to keep the individual interconnected cells at the same temperature level to ensure a uniform charge acceptance and delivery during continuous operation. Particular difficulties arise if a multiplicity of such storage units created by interconnection are in turn interconnected to form series which have a high system voltage.

Rechargeable batteries with a number of cylindrical cells which are interconnected are disclosed, for example, by DE 19750069 A1. In this case, a temperature-control device is provided between the cells which comprises a hollow body through which a temperature-control medium flows and which has semicircular bulges, the radii of which correspond approximately to those of the cells, and which are arranged in such a way that they fix the spatial positions of the cells in relation to one another.

It would accordingly be advantageous to provide a sealed rechargeable battery which has sets of wound electrodes and in which the advantages of prismatic and cylindrical cells are combined with one another.

SUMMARY OF THE INVENTION

This invention relates to a sealed rechargeable battery including a housing having at least two main chambers, a cell separating wall positioned between the main chambers, and at least two electrode coils forming a storage element located within each main chamber, wherein the electrode coils in each main chamber are connected in parallel and the storage elements in the main chambers are electrically connected in series.

BRIEF DESCRIPTION OF THE DRAWINGS

The subject matter of the invention is explained in more detail below on the basis of FIGS. 1 to 3.

FIG. 1b is a cross section taken through the line I—I of FIG. 1a.

FIG. 3 is a perspective schematic view showing installation of interconnected sets of electrodes into a housing.

FIG. 4 shows a partial cross section through a rechargeable battery in the region of a cell separating wall.

DETAILED DESCRIPTION

Figure 1A:
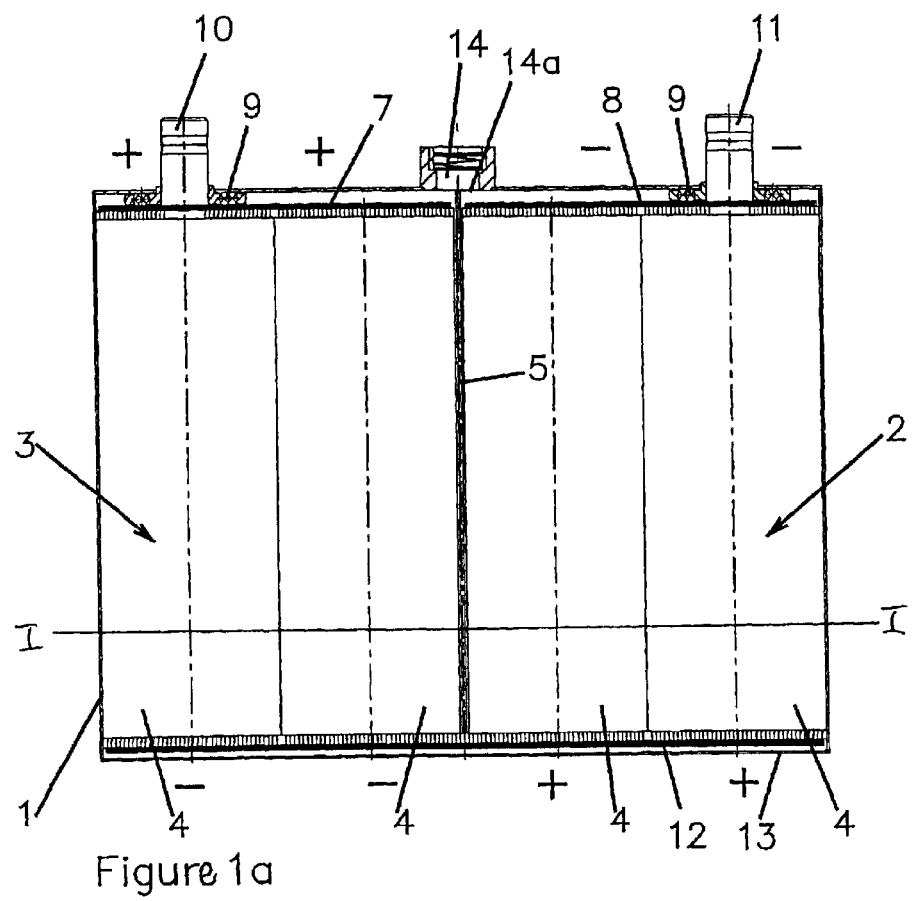
FIG. 1a shows a longitudinal section taken through a rechargeable battery according to aspects of the invention.

It will be appreciated that the following description is intended to refer to specific embodiments of the invention selected for illustration in the drawings and is not intended to define or limit the invention, other than in the appended claims.

According to aspects of the invention, the housing of the rechargeable battery has at least two main chambers separated by a cell separating wall and in each of which at least two electrode coils are arranged, the electrode coils within each of the main chambers being electrically connected in parallel and the storage elements formed in the main chambers being electrically connected in series. The positive poles of the electrode coils in each main chamber point in one direction and in the neighboring main chamber they point in the opposite direction.

The sets of wound electrodes are most preferably NiMeH or lithium-ion cells.

Figure 1B:
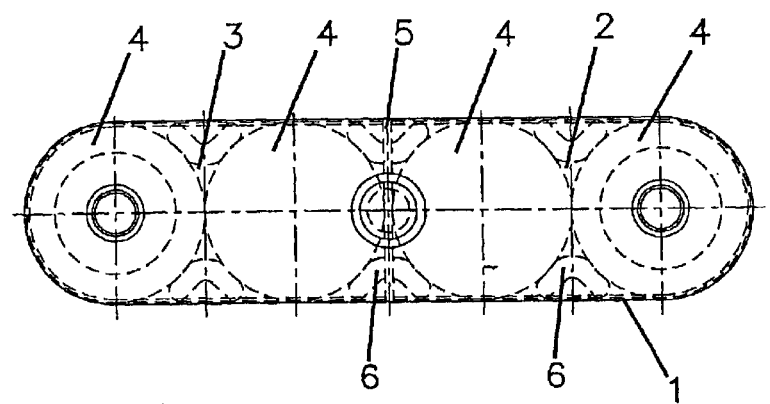

Turning now to the drawings, the invention provides a rechargeable battery housing 1, which has at least two main chambers 2 and 3. In each of these two main chambers 2 and 3 there are respectively arranged at least two electrode coils 4 which, in the customary way, comprise spirally rolled positive and negative electrodes and a separator. Provided between the two main chambers of the housing 1 is a separating wall 5. In the case of an approximately oval shaped housing, as shown in FIG. 1b, the cylindrical electrode coils may be supported by supporting devices 6, or the housing may be largely adapted to the shape of the electrode coils, as can be seen from FIG. 3.

The individual electrode coils 4 are arranged in such a way that in each main chamber 2 and 3 the two cells 4 are respectively connected in parallel. In the main chamber 3, the two electrode coils 4 are accordingly arranged with the positive electrode discharge element on the upper side. In the main chamber 2, the negative discharge element of the electrode coil is provided at the top. The upper positive poles and the corresponding negative poles are respectively connected by a pole discharge strip 7 and pole discharge strip 8.

The positive pole 10, connected to the pole discharge strip 7, is led through an opening in the cell housing 1 in the same way as the pole 11, connected to the negative pole discharge strip 8, with a sealing arrangement 9 interposed. An opening 14a is provided in the upper region of the cell separating wall 5 which permits a gas exchange between the neighboring main chambers 2 and 3, but avoids electrolyte passing through. Above this gas lead-through 14a there is arranged a pipe connecting piece 14, which receives a pressure-relief valve 20 (FIG. 3). In the lower region of the rechargeable battery according to the invention, all the sets of wound electrodes 4 and the storage elements formed in the main chambers are connected in series by means of a discharge element 12, and the cell container 1 is closed in this region by a cell base 13.

Figure 2:
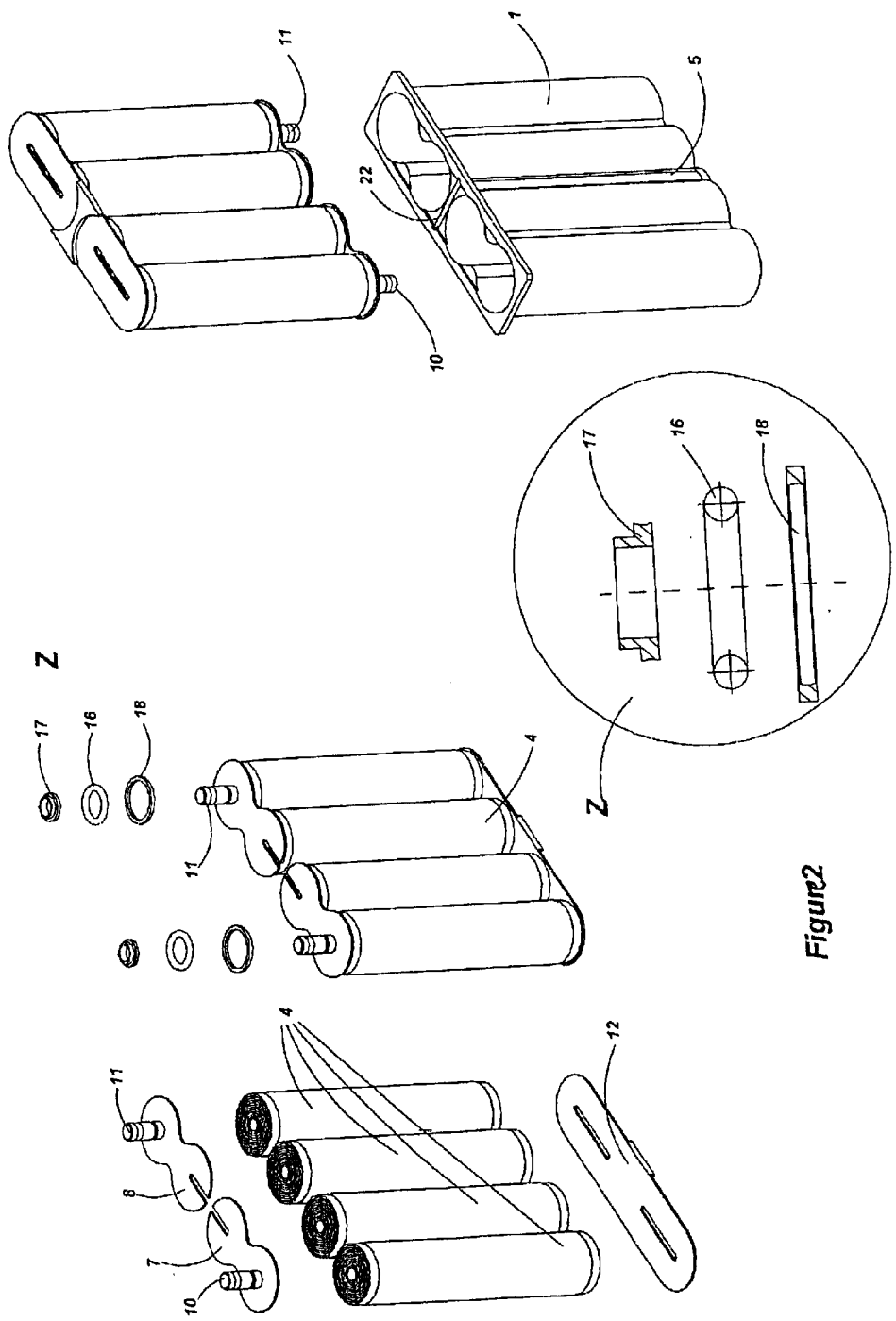
FIG. 2 is a perspective schematic view of the structure and interconnection of individual sets of wound electrodes.

The basic assembly of a rechargeable battery according to the invention is represented in FIGS. 2 and 3. On four cells 4, for example, which are arranged as explained above with respect to their polarity, large-area pole discharge strips 7 and 8 are welded, for example, in a soldering process known per se, an inductive welding process or by laser welding, as explained in more detail in German Patent Application 10015711.4. The pole discharge strips 7 and 8 are preferably provided with apertures or openings, which assist the distribution of the electrolyte.

A cell pole 10 is connected to the positive discharge strip 7. A cell pole 11 is connected to the negative discharge strip 8. In the lower region, all the cells 4 are connected by a large-area discharge strip 12, which extends through or over the cell separating wall 5, and are consequently connected in series. Sealing arrangements, which include, for example, an O-ring 16 which is held by an inner supporting ring 17 and an outer supporting ring 18, are subsequently applied to the poles 10 and 11. The sealing arrangement is shown on an enlarged scale as detail Z of FIG. 2. The cell assembly created in this way is introduced into the housing 1 with the cell separating wall 5.

As can be seen from FIGS. 2 and 3, the inner contour of the housing 1, which preferably consists of a suitable plastic material, is largely adapted to the contour of the electrode coils 4. The cell assembly is pressed into the housing 1, the poles pass through corresponding openings in the housing, and according to FIG. 3, the poles 10 and 11 are stressed with the aid of spring washers 19 and the necessary sealing forces for the O-ring 16 are thereby created.

Subsequently, the cell base 13 is fitted on and connected in a sealed manner to the housing 1 by welding or adhesive-bonding processes, for example, by laser welding or by a hot-plate welding process. The bushing of the strip discharge element 12 through the cell separating wall 5 is also sealed at the same time. When the cell is finished, a customary pressure-relief valve 20 can be inserted into the pipe connecting piece 14. The housing base 13 may be provided on its outer-facing side with ribs 21, which give the base increased strength. On the side facing the housing, the housing base may have a depression or groove 23 and the cell separating wall 5 may likewise have a groove 22 (FIG. 2) in the region in which the contact strip 12 covers it.

Elastic sealing material 27, which seals the bushing of the strip discharge element 12 in the region of the cell separating wall 5, is introduced into these depressions or grooves. For this purpose, a plastic, for example, a 2-component polymer, is introduced into this region via openings arranged in the housing base 13 and ensures good sealing of the entire bushing region of the discharge strip 12 through the cell separating wall 5.

In FIG. 4, the bushing region of the discharge strip 12 through the cell separating wall is shown on an enlarged scale. In this bushing region, the discharge strip 12 may be provided in particular with a soldered-on or welded-on electrically conductive reinforcement 24, which improves the conductivity and current-carrying capacity. As explained above, an elastic sealing composition, in particular a 2-component polymer, is forced or injected through openings in the housing base 13 (inlet opening 25, outlet opening 26) as sealing material 27.

What is claimed is:

1. A sealed rechargeable battery comprising:
   a housing having at least two main chambers;
   a cell separating wall positioned between the main chambers; and
   at least two electrode coils forming a storage element located within each main chamber;
   wherein the electrode coils in each main chamber are connected in parallel and the storage elements are electrically connected in series.

2. The sealed rechargeable battery as claimed in claim 1, further comprising positive poles associated with the electrode coils, wherein the positive poles of the electrode coils in one main chamber are oriented in one direction and the positive poles of the electrode coils in an adjacent main chamber are oriented in an opposed direction.

3. The sealed rechargeable battery as claimed in claim 1, further comprising positive and negative poles associated with the electrode coils, wherein the positive electrodes of the electrode coils in one of the main chambers are connected by a contact strip provided with a pole post and the negative electrodes of the electrode coils in another of the main chambers are connected by a contact strip provided with a pole post, and wherein opposite poles of all the storage elements are electrically connected in series by a contact disk connecting all of the storage elements.

4. The sealed rechargeable battery as claimed in claim 1, wherein the housing has an inner contour adapted to the shape of the electrode coils.

5. The sealed rechargeable battery as claimed in claim 1, wherein adjacent main chambers connect to a common gas space and a common safety valve via an opening.

6. The sealed rechargeable battery as claimed in claim 3, wherein the pole posts extend through a sealed opening in the housing, whereby sealing arrangements seal the pole posts to the housing and the sealing arrangements are held in position on an outer side of the housing by spring washers.

7. The sealed rechargeable battery as claimed in claim 3, wherein a portion of the contact disk extends through the cell separating wall and is sealed by an elastic sealing composition introduced into a groove in the cell separating wall and a groove in a base portion of the housing.

8. A method of producing a rechargeable battery as claimed in claim 3, comprising:

inserting the storage elements into the main chambers of the housing through an opening on an underside thereof such that the post poles pass through openings in an upper portion of the housing; and sealing the opening in the housing with a housing base.

9. The method as claimed in claim 8, wherein the housing and housing base consist of a plastic material and are connected to each other in a sealed manner by laser welding.

10. The method as claimed in claim 8, wherein the contact disk and the cell separating wall are sealed by a permanently elastic composition.

\* \* \* \* \*